United States Patent
Miller et al.

(10) Patent No.: US 9,893,543 B2
(45) Date of Patent: Feb. 13, 2018

(54) PORTABLE POWER CHARGER

(71) Applicant: Halo2Cloud LLC, Glastonbury, CT (US)

(72) Inventors: Garold C. Miller, Glastonbury, CT (US); Nathan Daniel Weinstein, Glastonbury, CT (US)

(73) Assignee: Halo2Cloud, LLC, Hartford, CT (US)

( * ) Notice: Subject to any disclaimer, the term of this patent is extended or adjusted under 35 U.S.C. 154(b) by 212 days.

(21) Appl. No.: 14/869,086

(22) Filed: Sep. 29, 2015

(65) Prior Publication Data

US 2017/0093190 A1  Mar. 30, 2017
US 2017/0366027 A9  Dec. 21, 2017

Related U.S. Application Data

(63) Continuation-in-part of application No. 13/682,985, filed on Nov. 21, 2012, which is a continuation-in-part of application No. 13/571,992, filed on Aug. 10, 2012, now abandoned.

(60) Provisional application No. 61/521,815, filed on Aug. 10, 2011.

(51) Int. Cl.
*H02J 7/00* (2006.01)

(52) U.S. Cl.
CPC .......... *H02J 7/0054* (2013.01); *H02J 7/0027* (2013.01); *H02J 7/0042* (2013.01); *H02J 2007/0062* (2013.01)

(58) Field of Classification Search
CPC ...... H02J 7/0054; H02J 7/0027; H02J 7/0042; H02J 2007/0062; H02J 7/1423; Y02E 60/12; H01M 10/44; H01M 10/46

USPC .......................................................... 320/103
See application file for complete search history.

(56) References Cited

U.S. PATENT DOCUMENTS

| | | |
|---|---|---|
| 5,829,993 A | 11/1998 | Wu |
| 5,847,545 A | 12/1998 | Chen et al. |
| 5,901,056 A | 5/1999 | Hung |
| D456,349 S | 4/2002 | Chuang |
| D478,546 S | 8/2003 | Andre et al. |
| 6,820,206 B1 | 11/2004 | Kim et al. |
| 6,828,754 B2 | 12/2004 | Yang |
| 6,894,457 B2 | 5/2005 | Germagian et al. |
| D509,181 S | 9/2005 | Nellenbach et al. |
| 7,011,538 B2 | 3/2006 | Chang |
| D543,940 S | 6/2007 | Hussaini et al. |
| D574,833 S | 8/2008 | Hussaini et al. |

(Continued)

FOREIGN PATENT DOCUMENTS

KR  2006-0087475 A  8/2006

*Primary Examiner* — Yalkew Fantu
*Assistant Examiner* — Mohammed J Sharief
(74) *Attorney, Agent, or Firm* — McCormick, Paulding & Huber LLP (57) ABSTRACT

A portable charger is provided for charging one or more electronic devices simultaneously from a rechargeable internal battery. To accommodate multiple electronic devices, a portable charger unit is combined with multiple connectors for connecting to more than one electronic device, as necessary. For example, the charger unit includes two or more connector cables removably attached to the charger unit and stored within the charger housing for connection to electronic devices when needed. An adapter unit is provided for connection to the charger unit for recharging the internal battery of the charger unit.

17 Claims, 9 Drawing Sheets

(56) References Cited

U.S. PATENT DOCUMENTS

| | | |
|---|---|---|
| D585,825 S | 2/2009 | Ji |
| D594,817 S | 6/2009 | Abdallah et al. |
| D610,094 S | 2/2010 | Ouimette et al. |
| D616,363 S | 5/2010 | Weng |
| D618,237 S | 6/2010 | Wang |
| 7,766,698 B1 | 8/2010 | De Luliis et al. |
| D628,151 S | 11/2010 | Wegener et al. |
| D628,152 S | 11/2010 | Fujii et al. |
| D628,153 S | 11/2010 | Fujii et al. |
| D628,535 S | 12/2010 | Cheng |
| 7,893,657 B2 | 2/2011 | Chavakula |
| D636,725 S | 4/2011 | Levy et al. |
| 7,942,691 B1 | 5/2011 | McSweyn |
| D641,695 S | 7/2011 | Wegener et al. |
| D656,096 S | 3/2012 | Sasada et al. |
| D659,094 S | 5/2012 | Brand et al. |
| D662,050 S | 6/2012 | Tien |
| D663,685 S | 7/2012 | Yang |
| 8,215,983 B2 * | 7/2012 | Obata .................. G11B 33/025 439/528 |
| D667,788 S | 9/2012 | Mai |
| D672,309 S | 12/2012 | Tien |
| D674,748 S | 1/2013 | Ferber et al. |
| D675,988 S | 2/2013 | Levy et al. |
| D680,063 S | 4/2013 | Sasada |
| D682,196 S | 5/2013 | Leung |
| D682,197 S | 5/2013 | Leung |
| D686,153 S | 7/2013 | Qu |
| 8,491,330 B2 | 7/2013 | McSweyn |
| D697,867 S | 1/2014 | Weinstein et al. |
| D702,632 S | 4/2014 | Salmon |
| D783,785 S | 4/2017 | Bates-Hurtado |
| 2003/0030412 A1 | 2/2003 | Matsuda et al. |
| 2004/0085694 A1 | 5/2004 | Germagian et al. |
| 2005/0170699 A1 | 8/2005 | Overtoom |
| 2007/0182365 A1 | 8/2007 | Yang |
| 2007/0247105 A1 | 10/2007 | Krieger et al. |
| 2008/0061739 A1 * | 3/2008 | Lu .................. H02J 7/0042 320/114 |
| 2008/0284371 A1 | 11/2008 | Hsu |
| 2009/0267562 A1 | 10/2009 | Guccione et al. |
| 2010/0109602 A1 | 5/2010 | Chang |
| 2012/0187902 A1 | 7/2012 | Wang |
| 2012/0238132 A1 | 9/2012 | McSweyn |
| 2013/0193911 A1 * | 8/2013 | Miller .................. H02J 7/0042 320/107 |
| 2014/0152257 A1 | 6/2014 | Miller et al. |
| 2014/0159639 A1 * | 6/2014 | Miller .................. H02J 7/0042 320/103 |

* cited by examiner

PORTABLE POWER CHARGER

CROSS-REFERENCE TO RELATED APPLICATION

This application claims the benefit of U.S. application Ser. No. 13/682,985, filed Nov. 21, 2012, U.S. application Ser. No. 13/571,992, filed Aug. 10, 2012, and U.S. Provisional Application No. 61/521,815, filed Aug. 10, 2011, which are incorporated herein by reference.

FIELD OF INVENTION

The present invention generally relates to power chargers for electronic devices, and more particularly relates to a portable charger capable of charging multiple electronic devices simultaneously.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different ports and interfaces such that a single charging cable is not compatible with multiple devices. Accordingly, a tech-savvy consumer, with several electronic devices, will usually have multiple charging cables to keep track of. Even then, the consumer may not always be in a place where a power source is readily available, or even if so, may not have the appropriate cable or adapter available to use with a particular power source.

With traditional power sources, such as those noted above, it is difficult to charge multiple devices at the same time, especially where each device requires a separate charging cable. For example, a car charger port will only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters tend to be bulky.

Multi-source adapters are also available on the market for making a charging cable compatible with multiple power sources. For example, a charging cable with a traditional plug interface for connecting the cable to a wall outlet could exchange the plug with a car charger interface, or an airplane charger interface, or a standard USB interface. However, for such adapter devices, each of the interfaces is usually a separate piece, and therefore difficult to keep track of when not in use.

Similarly, interface attachments are also available for adapting a charging cable for use with a variety of devices, each with a different interface. However, such attachments are usually separate pieces, and therefore difficult to keep track of when not is use. Further, use of such attachments does not solve the problem presented by the need to charge multiple devices at the same time, as oftentimes, only one attachment can be used with a charging cable at a time.

Existing power charger devices also usually cannot charge multiple devices at the same time. Even if multiple devices may be attached to the power charger at the same time, the charger will prioritize how the devices are recharged—i.e., it will charge one device first and then the second. However, this approach risks not having sufficient charge remaining in the charger for fully charging the second device.

Further, some portable charger devices will not permit recharging from the charger when the charger is itself being recharged or connected to a power source. Such devices require the charger unit to be disconnected from a power source before a charge will be passed on to a device connected to the charger. Also, some such charger devices must be fully charged first before any device connected to the charger unit can be recharged.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable and easily used in various conditions and locations to charge one or more electronic devices simultaneously, including but not limited to in a house or office, a car or an airplane. Still further, there is a need for a charger system that is compatible with a personal computer for not only charging one or more electronic device, but also provides a conduit by which data can be exchanged between such devices and a portable computer or an external storage database. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable charger is provided for charging one or more electronic devices. In general, a portable charger kit may comprise a portable charger unit combined with multiple connectors for connecting to more than one electronic device, as necessary. For example, the charger unit can include at least one power output for connection to electronic devices via connectors or charging cables, including a squid connector providing multiple connection interfaces adaptable to a variety of electronic devices. Alternatively, the charger unit can include connector cables connected to the charger unit and disposed within the charger housing for connection to electronic devices. Additionally, a portable charger kit may comprise a portable charger unit combined with an adapter unit for recharging the charger unit. Additional cables can be provided in the kit, such as a USB connection cable for connecting the portable charger unit to a computer for recharging or data exchange, without departing from the principles and spirit of the present invention.

In a first aspect of the present invention, the charger unit comprises a charger housing with a power input and at least one power output. A rechargeable battery is disposed within the charger housing and is operatively connected with the power input (for providing an electrical charge from an external power source for recharging the internal battery when the charge unit is connected to the power source) and the at least one power output (for charging other electronic devices from the rechargeable battery). The charger unit is portable as a result of the small size of the housing. Despite the small size of the unit, the power capacity is very high so that the charger can accommodate multiple electronic devices at the same time. The charger unit further comprises connector means capable of connecting electronic devices to the charger unit via at least one output port.

In an embodiment of the charger unit of the present invention, multiple connector cables, each having a respective connection interface, is attached to the charger housing and operatively connected to a respective power output of the charger unit, thereby permitting multiple electronic devices to be charged by the charger unit simultaneously. Preferably, the charger housing includes multiple cavities in which each connector cable may be stored, when not in use, and from which each connector cable may be removed and flexed when needed for recharging an electronic device.

In another embodiment of the charger unit of the present invention, a connector cable can be provided with the charger that has two connection interfaces for connection with a respective electronic device in need of recharging. The connector cable can be operatively connected to a power output of the charger unit, permitting multiple electronic devices to be simultaneously charged from a single power output. Preferably, the charger housing includes a cavity in which the connector cable and its two connection interfaces, may be stored when not in use, and from which, the connector cable may be removed and flexed when needed for recharging one or more electronic devices.

In various embodiments of the present invention, the charger unit may further comprise a controller or processing unit, which can keep track of the capacity level of the battery unit, store data or provide a conduit means by which data can be exchanged between electronic devices, such as between a smart phone and a computer.

An advantage of providing multiple connector cables—attached to and included with the charger unit—is that several electronic devices can be charged at the same time. Moreover, multiple connector interfaces can be designed to be interchangeably used with the connector cable(s), and when used, attach to and accommodate various types of devices, including smart phones, mobile phones, data tablets, music players, cameras, camcorders, gaming units, e-books, Bluetooth headsets, GPS devices, and the like. Still further, each connector cable can be removable from the charger housing and replaced by a different connector cable with a different connection interface.

These and other objects, features and advantages of the present invention will become apparent in light of the detailed description of embodiments thereof, as illustrated in the accompanying drawings.

DETAILED DESCRIPTION OF THE DRAWINGS

A portable charger in accordance with the present invention is shown by FIGS. 1-4 and is generally designated by reference numeral 110. The portable charger 110 is designed for on-the-go charging of portable electronic devices when a standard power source is not readily available. In this regard, the charger unit 110 is equipped with a rechargeable internal battery and with connection means that are operatively connected to the rechargeable battery for recharging one or more electronic devices connected to the charger unit 110 by such means.

The portable charger unit 110 may have a variety of designs, as discussed further below, and may be provided with connector cables 125a, 125b and/or adapters suitable for recharging the internal battery of the charger unit 110 and for recharging the batteries of various electronic devices connected thereto. For example, the portable charger kit may be combined with at least one of an adapter unit, such as described and shown in co-pending U.S. application Ser. No. 13/801,338, which is incorporated herein by reference, for connecting the charger unit to an external power source, and a connector cable, for connecting one or more electronic devices to the charger unit, such as described and shown in co-pending U.S. application Ser. No. 13/571,992, which is incorporated herein by reference.

In accordance with intended operation of such a portable charging kit, a user can recharge one or more electronic devices using the charger unit, and can in turn recharge the charger unit 110 from a computer, a wall socket, a car power outlet, or an airplane power outlet. For example, the kit of the present invention can be used to charge smart phones, mobile phones, data tablets, music players, cameras, camcorders, gaming units, e-books, Bluetooth® headsets and earpieces, GPS devices, and the like, either individually or collectively in various combinations. In accordance with another feature of the present invention, the portable charger kit can also be used as a conduit by which data can be exchanged between electronic devices and a portable computer or an external storage database.

Figure 4A:
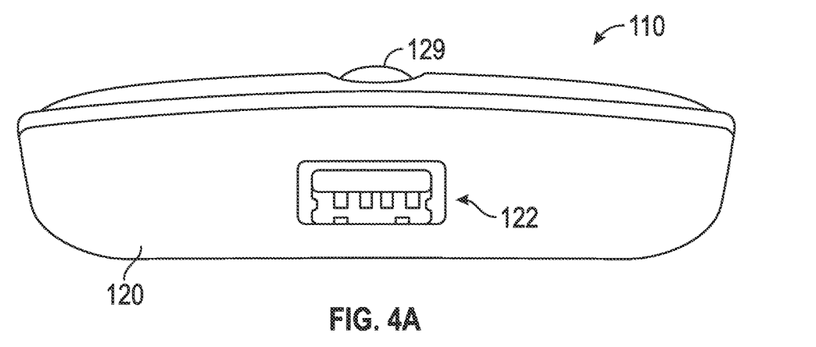
FIGS. 4A and 4B show end views of the portable charger unit of FIG. 1.
Figure 4B:
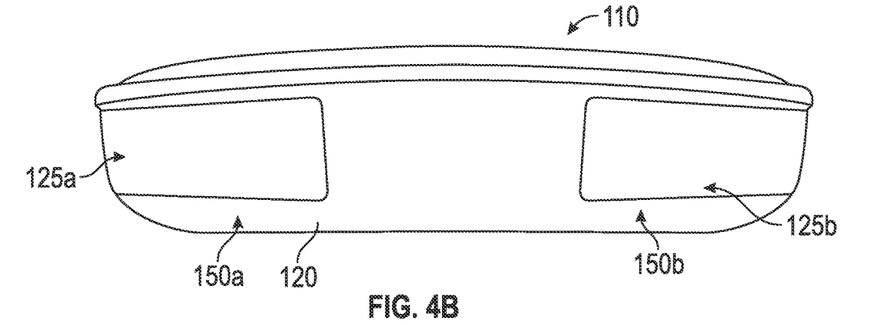
Figure 5:
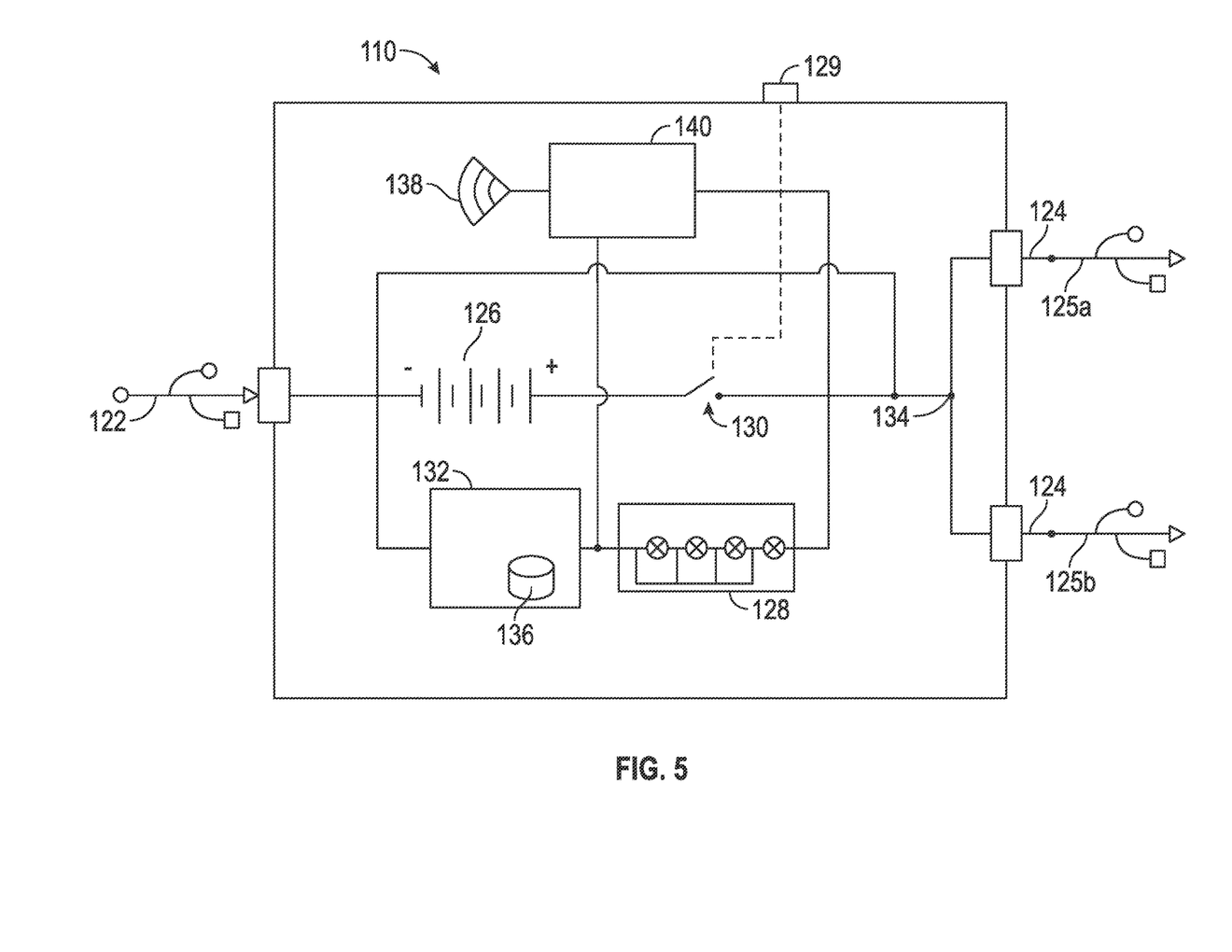
FIG. 5 shows schematically an internal configuration of the portable charger unit of FIG. 1.

Still referring to FIGS. 1-4, and also to a schematic of internal components as shown by FIG. 5, the exemplary charger unit 110 comprises a charger housing 120 with a power input 122 and at least two power outputs 124, with connector cables 125a and 125b attached to the power outputs 124 at the charger housing 112. It is optimal for on-the-go use of the charger unit 110 to include connector cables that are attached to and stored with the charger housing 120 and thus less susceptible to be lost as is often the case with charging cables that are separate from both a charger unit and an electronic device with which the charging cable is used. Accordingly, as illustrated in FIGS. 2-5, two connector cables 125a and 125b are attached to power output ports 124 of the charger unit 110 to connect respective electronic devices to the charger unit 110 to be recharged from an internal rechargeable battery unit 126. As shown, the charger unit 110 further includes a power indicator means 128 (comprising three lights) and an on-off button 129, each operatively connected to the internal functional components and electrical circuitry for operating the charger unit 110.

Figure 6:
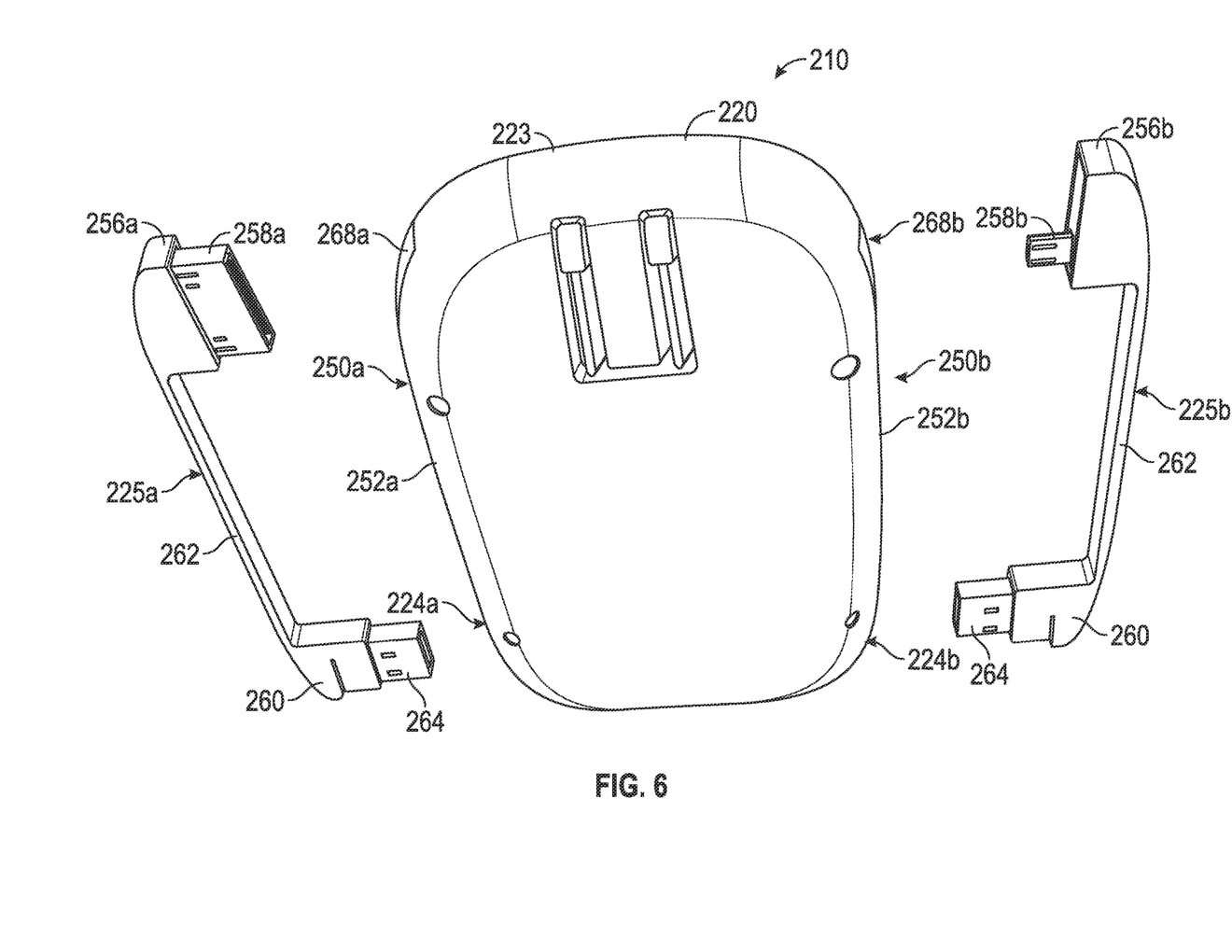
FIG. 6 shows a second portable charger unit according to the present invention.

Referring to FIG. 5, the charger unit 110 comprises a rechargeable battery unit 126 disposed within the charger housing 120 that can be recharged by connecting the charger unit 110 to an external power source, such as a computer, a wall socket, a car or an airplane, using a power connecter attached to the power input 122 of the charger unit 110. For example, the power connector can be a charging cable having a standard USB interface on one end for insertion into the input port 122 of the charger unit 110 and a similar USB interface on the other end for insertion into a USB port of a computer. Alternatively, the USB interface of such a cable can be inserted into an adapter unit included in the portable charger kit of the present invention or separately supplied for connection to a standard power source, such as a wall-socket via a standard U.S. plug or a variety of foreign plug styles, a car charger socket—e.g., a cigarette lighter socket—via a car charger interface, or an airplane charger socket via an airplane charger interface. Still further, a charger unit in accordance with the present invention can include a power input interface, such as a wall plug interface as illustrated in FIG. 6 and described further below.

The charger unit 110 also can include communications components for sending and receiving data and media. For example, an antenna 138 is provided in connection with a transceiver 140, or a receiver and transmitter (not shown), for communication over a wireless communication link. Components of transceivers, receivers, and transmitters are generally well known in the technical field, and thus are not further discussed herein.

In preferred embodiments, the rechargeable battery unit 126 is preferably a Lithium-Ion battery disposed within the charger housing 120 and operatively connected with the power input port 122 for recharging the battery 126 when the charger unit 110 is connected to an external power source via the power input 122. The rechargeable battery 126 is also operatively connected with each of the power output ports 124—via an internal switch 130, operable by the on/off button 129—for recharging electronic devices connected to the charger unit 110 via the power output ports 124 from the rechargeable battery unit 126.

Figure 12:
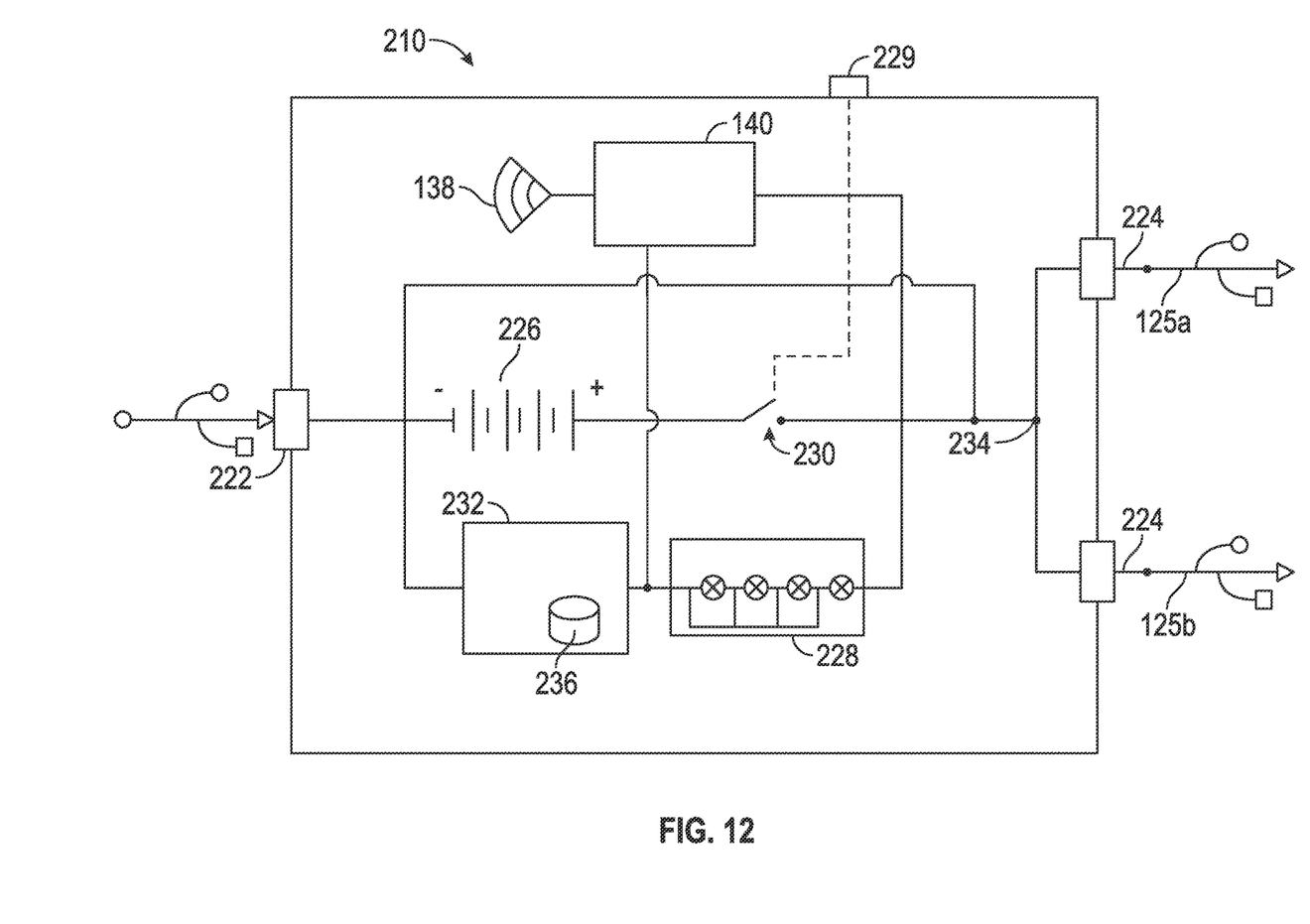
FIG. 12 shows schematically an internal configuration of the portable charger unit of FIG. 6.

Other components of FIG. 5 are similarly numbered, and similar to, components of FIG. 12 as further described herein.

The connector cables 125a and 125b may be permanently connected to the charger housing 120 and the output ports 124, or alternatively, as further discussed with reference to FIGS. 6-11, cables may be provided with the charger unit that are removable and interchangeable with other cables so as to permit different connection interfaces to be used with the charger unit.

Figure 1:
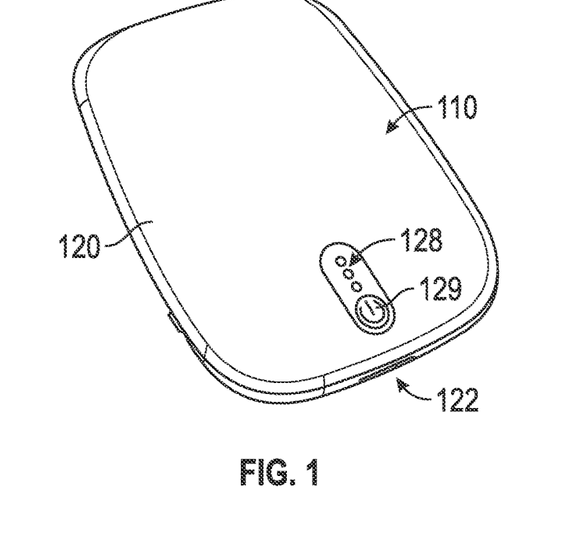
FIG. 1 shows a portable charger unit in accordance with the present invention.
Figure 2:
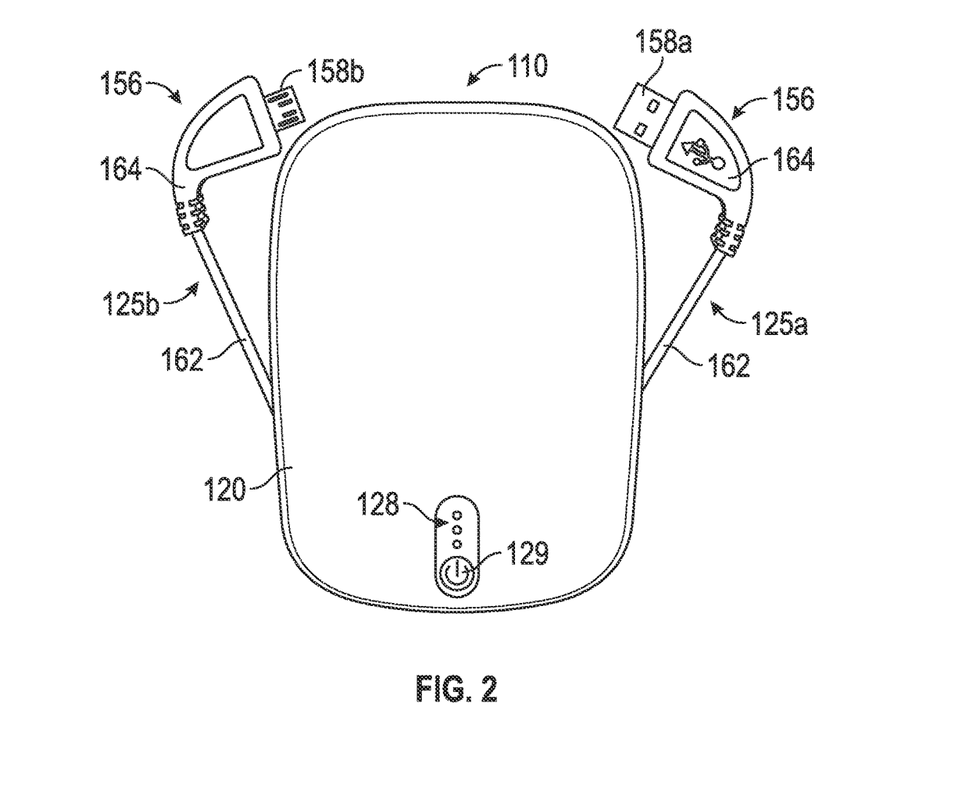
FIG. 2 shows the portable charger unit of FIG. 1 with a connector deployed according to the present invention.
Figure 3A:
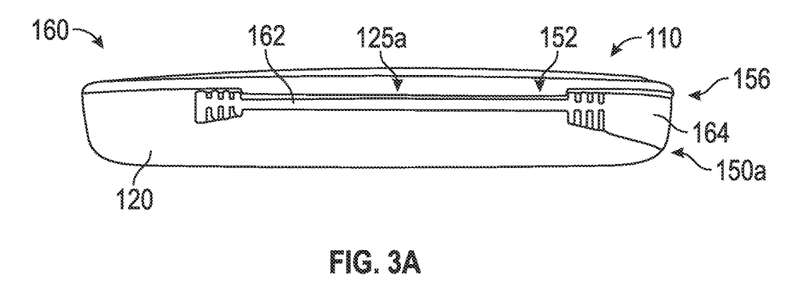
FIGS. 3A and 3B show side views of the portable charger unit of FIG. 1.
Figure 3B:
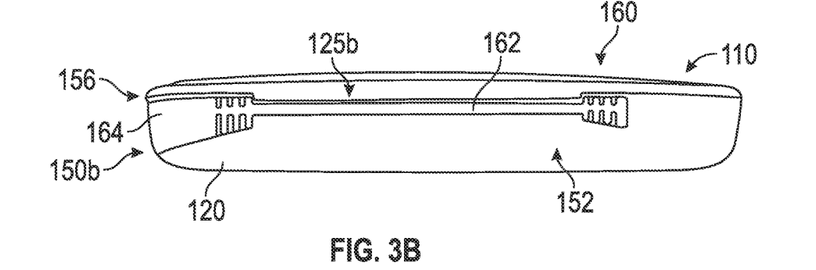

Referring still to FIGS. 1-4, storage cavities 150a and 150b are indented into the charger housing 120 for receiving the connector cables 125a and 125b when not in use. For example, FIGS. 3A and 3B illustrate the connecter cables 125a and 125b disposed within the exterior volume and footprint of the charger housing 120 in a non-use condition. By comparison, FIG. 2 shows distal heads 156 of the connector cables 125a and 125b that are removed from the storage cavities 150a and 150b so as to expose their respective connection interfaces 158a, 150b for connection to electronic devices.

Referring still to FIG. 2, the connector cables 125a and 125b each include a distal head 156 having a connection interface 158. For example, one cable 125a comprises a USB connection interface 158a, while the other cable 125b comprises a micro-USB connection interface 158b. The cables 125a and 125b may utilize any known interface without departing from the spirit and principles of the present invention. Additionally, as noted above, the cables 125a and 125b can be removable and replaceable so as to permit a user to easily change the connection interface for use with varying electronic devices. In this regard, and as further discussed below with reference to FIGS. 6-9, proximal heads of the connector cables may include an interface that complements respective output ports provided in the charger housing for attaching the connector cables to the charger.

The connector cables 125a and 125b are preferably flexible so they can be bent away from the charger housing 120 to connect to an electronic device during use of the charger unit 110. The storage cavities 150a and 150b include channels 152 to receive an elongated cord portion 162 of each of the cables 125a and 125b within the footprint of the charger housing 120. The distal heads 156 of the connector cables 125a and 125b, each includes its respective connection interface 158 and is received within an interface receptacle 164 of each respective storage cavity 150a and 150b on the charger housing 120. In some embodiments, the shape of the head 156 complements the interface receptacle 164 to provide a sleek look to the charger housing 120 when the connector cables 125a and 125b are stored. Additionally, the head 156 and cord portion 162 of each cable 125a and 125b are preferably snap-fitted into the storage cavity 150a or 150b when stored so that the connector cables 125a and 125b do not accidentally disengage or otherwise come loose from the storage cavities 150a and 150b.

In other embodiments, especially those where the connector cables can be removed and replaced, the interface receptacle receiving the distal head of a connector cable is sufficiently designed so as to accommodate heads with varying connection interfaces, and thus sizes and dimensions. Preferably, the storage cavity still permits the head to be stored within the storage cavity in a manner that provides a sleek look to the charger housing when the connector cables are stored, and thus, where connector cables are interchangeable, the distal heads on each cable are preferably uniform in shape, size and dimension so that they can be snap-fitted into the interface receptacle in the charger housing regardless of the connection interface for the cable.

Referring to FIG. 4A, the charger housing 120 further includes a power connection port 122 that can act as a power input for connecting the charger unit 110 to an external power source to recharge the internal rechargeable battery unit. As shown, the power connection port 122 comprises a USB port, but can take the form of any known interface for connecting a device with a power source, including but not limited to a mini-USB interface, a micro-USB interface, or a coaxial plug interface.

In an alternate embodiment of the charger unit 110, the charger housing 120 can include one or more additional output ports comprising, for example, a USB port for receiving a separate connector cable to attach additional devices to the charger unit 110. Indeed, a squid connector can be used to connect multiple devices to the charger unit 110 even when both of the connector cables 125a and 125b are already connected to respective devices. Still further, one of the attached connector cables 125a or 125b may be designated as a power input connection for recharging the internal rechargeable battery 126, and the other connector cable 125a or 125b and an output port (e.g., power connection port 122 shown in FIG. 4A) provided on the charger housing 110 can be used to charge multiple electronic devices simultaneously. In such a situation, the output port requires a separate cable to be connected between the charger unit 110 (via the output port) and the device(s) to be recharged.

In accordance with the present invention, the charger unit is readily portable as a result of the small size of the housing. Despite the small size of the unit, the power capacity is very high (e.g., 5500 mAH or 6000 mAH) so that the charger can accommodate multiple electronic devices at the same time.

Alternate embodiments of the charger unit are illustrated in FIGS. 6-11 and particularly includes removable and interchangeable connector cables 225 or 325. As shown in FIG. 6, a charger unit 210 comprises a charger housing 220 having two flexible connector cables 225a and 225b storable within respective storage cavities 250a and 250b and attached to respective output ports 224a and 224b of the charger unit 210 to connect respective electronic devices to the charger unit 210 to be recharged from an internal rechargeable battery unit 226. As noted, it is optimal for on-the-go use of the charger unit 210 to include connector cables that are stored with the charger housing 220. The functionality of the charger unit 210 is improved by permitting the connector cables to be removed and replaced by a different charging cable, especially where different connection interfaces are needed for different electronic devices a user may be carrying.

As further shown, the charger unit 210 further includes a power indicator means 228 and an on-off button 229, each operatively connected to internal functional components and electrical circuitry similar to those shown in FIG. 5, for operating the charger unit 210.

Figure 7:
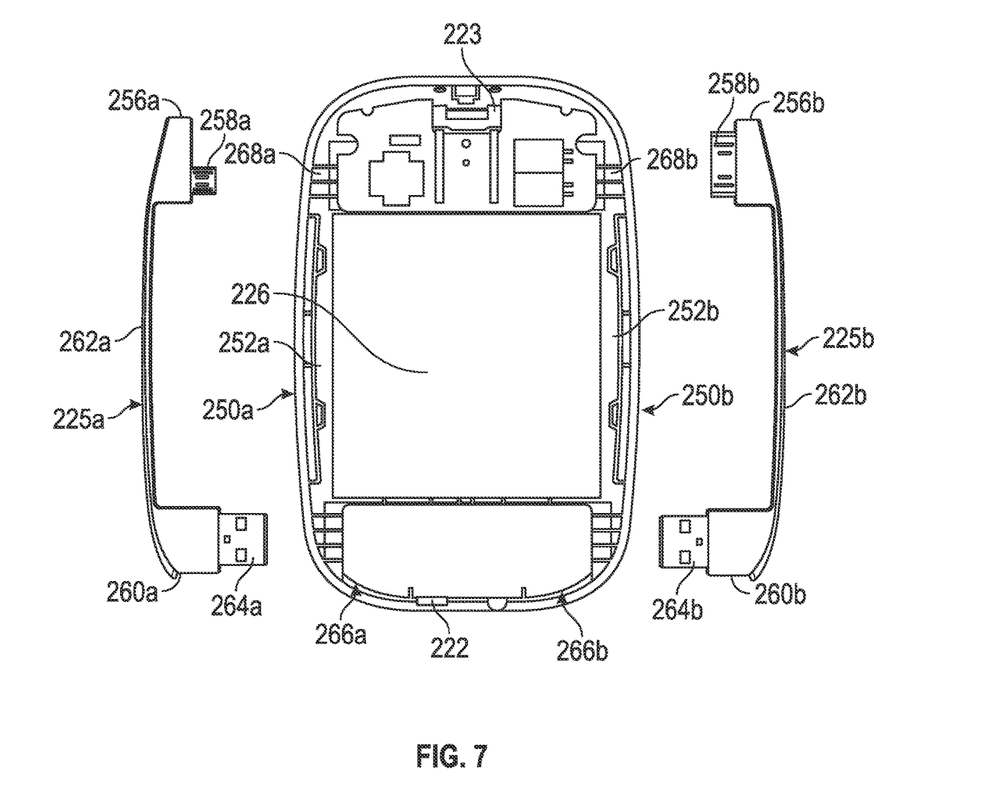
FIG. 7 shows a partly disassembled bottom view of the portable charger unit of FIG. 6.
Figure 8:
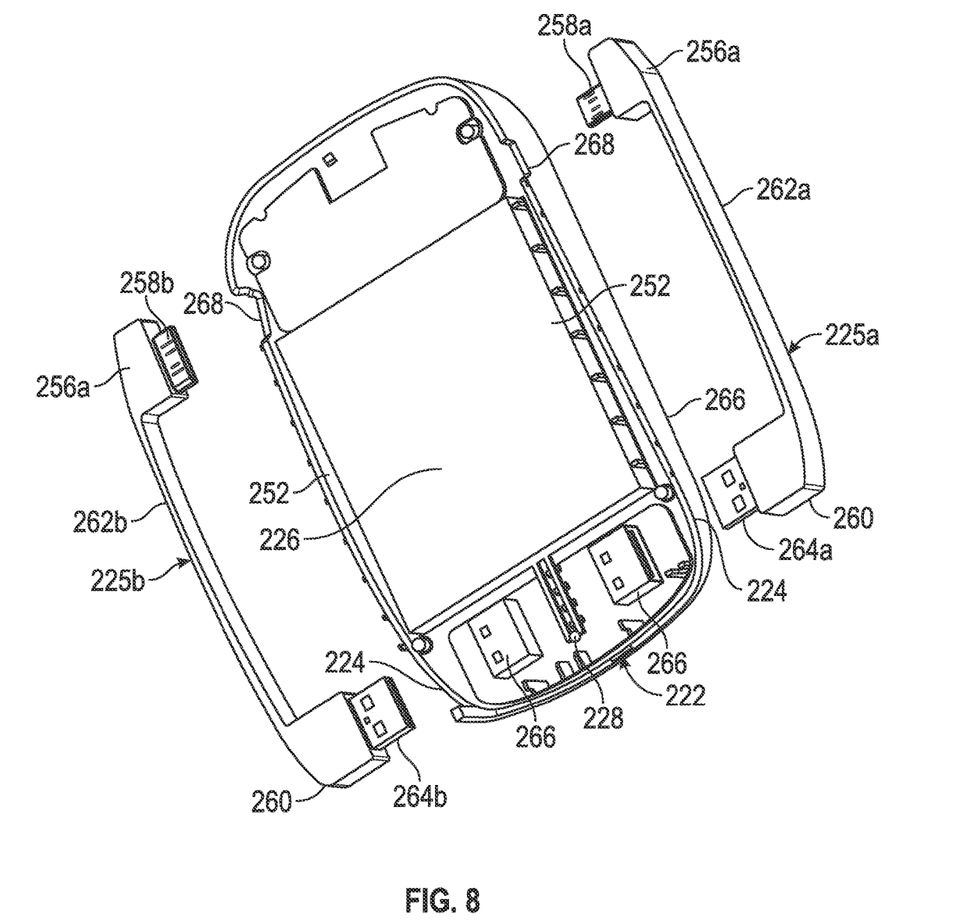
FIG. 8 shows a partly disassembled top view of the portable charger unit of FIG. 6.
Figures 9, 10:
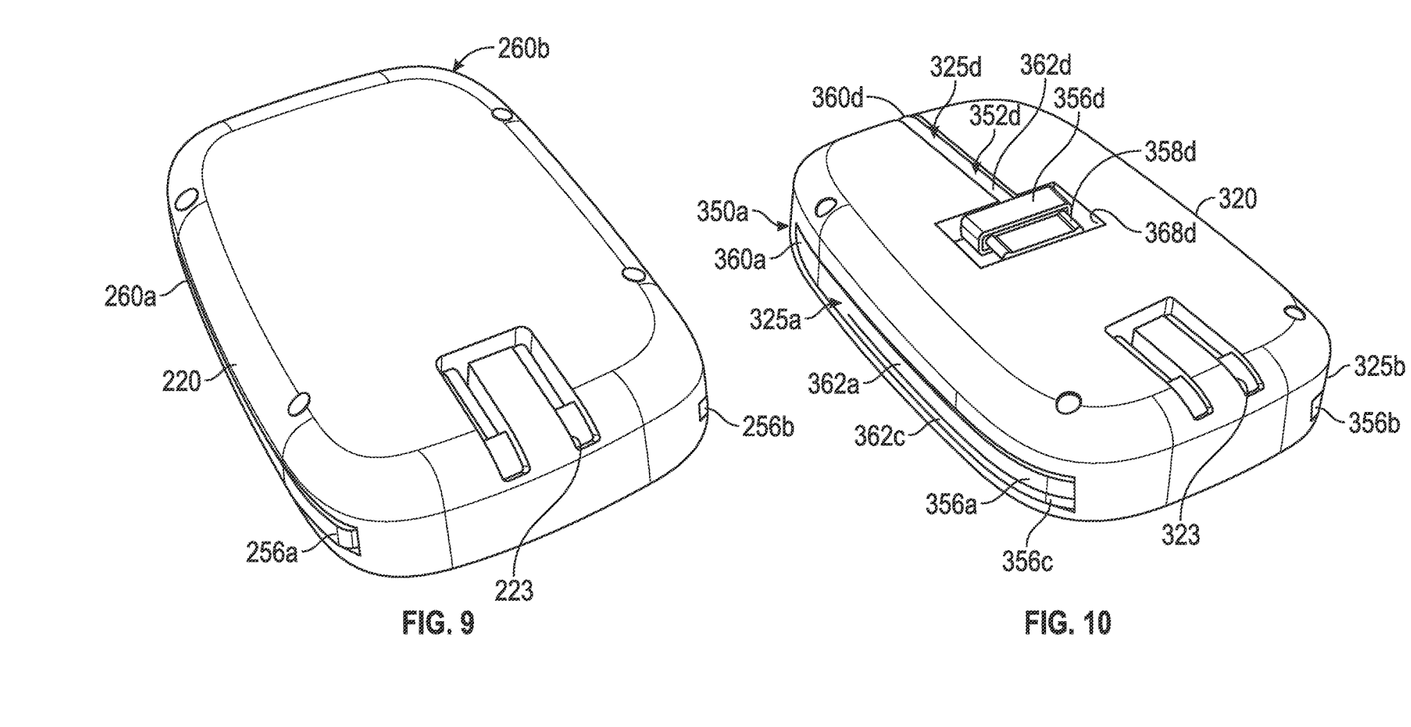
FIG. 9 shows a bottom view of the charger unit of FIG. 6.
FIG. 10 shows a third portable charger unit according to the present invention.
Figure 11:
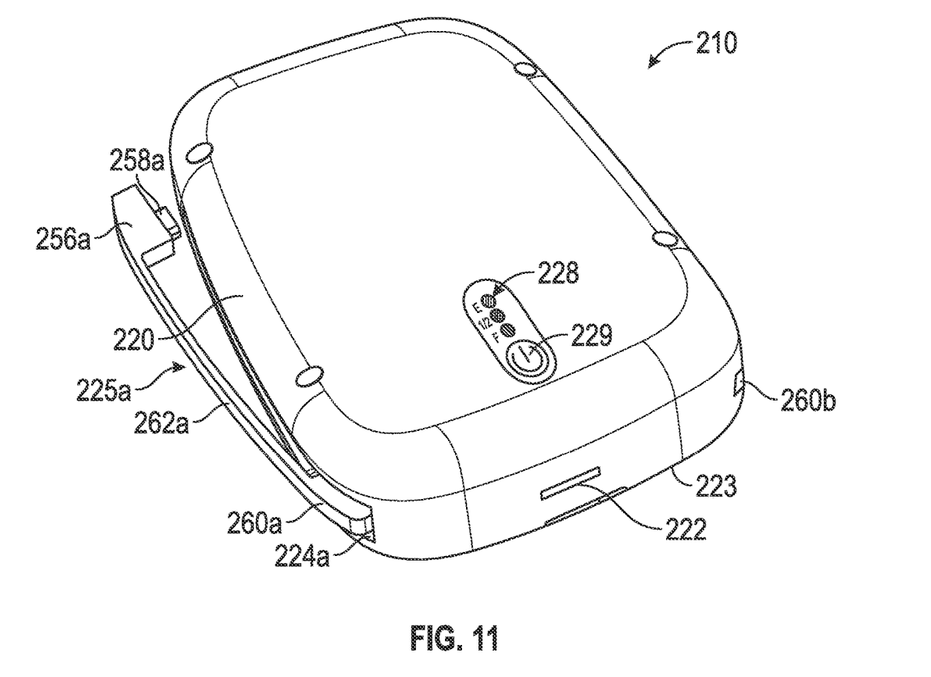
FIG. 11 shows a charger unit of FIG. 6 or FIG. 10, with a connector deployed according to the present invention.

As noted, the connector cables 225a and 225b are preferably removable and replaceable so as to permit different connection interfaces to be used with the charger unit 210. Storage cavities 250a and 250b are formed into the charger housing 220 for receiving the connector cables 225a and 225b when not in use. For example, FIG. 9 illustrates the connector cables 225a and 225b disposed within the exterior volume and footprint of the charger housing 220 in a non-use condition. By comparison, FIG. 11 shows one of the distal heads 256 of one of the connector cables 225a and 225b removed from its storage cavity 250 so as to expose its connection interface 258 for connection to an electronic device. Further, in accordance with an interchangeable aspect of the present invention, FIGS. 6-8 show the entire connector cables 225a and 225b removed from the storage cavities 250a and 250b to illustrate the facility with which the connector cables 225a and 225b can be removed and replaced by new connector cables (e.g., connector cable 225c) having a different connection interface 258.

Referring again to FIG. 6, the connector cables 225a and 225b each include a distal head 256 having a connection interface 258 and a proximal head 260 having a connection interface 264. The distal head 256 is joined to the proximal head 260 by a flexible body 262, which houses a flexible conductive element (i.e. a wire). In general, the proximal connection interface 264 is designated for connection with an output port 224 included in the charger housing 220, and as illustrated in FIGS. 6-8, comprises a standard USB interface adapted to be received in and engage a standard USB connection port. The distal connection interfaces 258 are designed for connection with electronic devices in need of recharging from the charger unit 210. Preferably, each connector interface uses a different distal connection interface 258 so that the charger unit 210 can be used with electronic devices having varying charging ports simply by interchanging connector cables as appropriate. For example, as illustrated in FIG. 6, one connector cable 225a provides a micro-USB connection interface 258a, while the other connector cable 225b provides an Apple® Lightning™ connection interface 258b. The cables 225a and 225b may utilize any known interface without departing from the spirit and principles of the present invention. Thus, a kit could be provided with the charger comprising multiple connector cables, each having a different connection interface (including, but not limited to, a USB interface, a micro-USB interface, a mini-USB interface, a 30-pin interface, or a Lightning interface), whereby, in the embodiments illustrated in FIGS. 6-11, two connector cables could be stored with the charger housing for on-the-go use. More preferably, as noted above, the cables 225a and 225b can be removed and replaced with other connector cables that provide matching distal heads 256, proximal heads 260, and proximal connection interfaces 264 while providing different distal connection interfaces 258 so as to permit a user to easily change the connection interface for use with varying electronic devices.

The connector cables 225a and 225b preferably are sufficiently flexible so that they can be bent away from the charger housing 220 to connect to an electronic device during use of the charger unit 210, as shown in FIG. 11. The storage cavities 250a and 250b include channels 252 to receive an intermediate portion 262 of each of the cables 225a and 225b within the footprint of the charger housing 220. Each of the storage cavities 250 also comprises a proximal portion 266 that adjoins the channel 252 adjacent to the power output port 224 for receiving the proximal head 260, as well as a distal portion 268 that adjoins the channel 252 for receiving the distal head 256 of the connector cable.

The proximal heads 260 of the connector cables 225a and 225b each include a USB connection interface 264 that is insertable into a respective one of the USB output sockets 224 that are supplied in the charger housing 220, adjacent the storage cavities 250a, 250b. More particularly, when the proximal heads 260 are positioned within their respective proximal portions 266 of the storage cavities 250a, 250b, the USB interfaces 264 engage the USB sockets 224. The distal heads 256 may be removed from the distal portions 268 of their respective storage cavities 250a, 250b and flexed away from the charger housing for use while the proximal heads 260 remain in their respective storage cavities and the USB interfaces 264 remain connected to the output ports 224. When the proximal heads 260 are stored within the storage cavities 250, they preferably form a smooth continuity with an outer surface of the charger housing 220 so as to provide a sleek look to the housing 220 when the connector cable is stored.

Each of the distal heads 256 of the connector cables 225a and 225b, having connection interfaces 258, is received within a respective distal portion 268 of the respective storage cavity 250a and 250b on the charger housing 220. Preferably, each distal head 256 is snap-fitted into the distal portion 268 of the storage cavity 250 so that it does not accidentally disengage or otherwise come loose from the storage cavity while also providing a sleek look to the charger housing 220 when the connector cable is stored. The storage cavities 250 are preferably designed to accommodate distal connection interfaces of varying design, shape and size so that the connector cables can be easily interchanged without detracting from the aesthetics of the charger housing 220 when the cables are stored within the housing 220.

In other embodiments, such as that illustrated in FIG. 10, at least one of the connector cables 325 can include plural distal heads 356 and associated connection interfaces 358. In this regard, the connector cable 325a is split so that each distal head 356a, 356c can be independently flexed out and away from the charger housing 320 and optimally both connection interfaces 358a, 358c can be connected to a respective electronic device in need of recharging. The storage cavity 350a, and more particularly, the interface portion 368, can be designed to accommodate both distal heads 356a, 356c in a storage condition without affecting the shape, size and aesthetics of the charger housing 320. Thus, the split connector cable 325a includes two connection interfaces 358a, 358c at distal heads 356a, 356c of the cable, and as a result, comprises an intermediate portion 362 that is split into two portions 362a, 362c, each portion associated with a distinct distal head 356 and interface 358 thereon.

As shown, one interface comprises a micro-USB interface and one interface comprises an Apple® Lightning™ interface. The distal heads 356 are stored adjacent to one another in a common interface portion of the storage cavity. Likewise, the intermediate portions 362 of the connector cable 325 are collectively stored in a common channel 352 along the side of the charger housing. In use, the entire distal head 356 may be removed and flexed away from the charger housing while the proximal head 360 remains connected to the output port. The distal heads 356a, 356c can be further flexed away from one another and be simultaneously connected to respective electronic devices for charging. In alternate embodiments, separate storage cavities could be provided for each of the distal heads and associated interfaces. In this regard, one of the distal heads could be removed from the storage cavity for use without need to remove the other distal head. As with other embodiments described herein, the entire connector cable could be removed, exposing the output port for use with another connector cable, as desired.

As further shown in FIG. 10, at least a third connector cable 325d can be provided which has a proximal end 360d hardwired into the charger housing 320 as well as a distal head 356d, carrying a connector 358d (e.g., a 30-pin connector as shown) and stored within a cavity 368d indented into the outer surface of the charger housing 320. The body 362d of the third connector cable likewise is stored within a slot 352d that is indented into the charger housing 320.

As illustrated in FIGS. 6-8, an entire connector cable 225 may be removed from its storage cavity 250. As discussed above, this allows different connector cables with different connection interfaces to be used so that electronic devices having varying power connection ports can be recharged using a charger unit in accordance with the present invention. In embodiments of the present invention, the shape and design of the storage cavities can be uniform so that connector cables can be attached to and stored within the charger 210 on either side of the charger housing 220. In this regard, the size and shape of the proximal heads, distal heads and intermediate portions of each connector cable can be uniform, with only the design of the connection interfaces varying. Thus, one would not need to keep track of connector cables designated for specific storage cavities and could freely interchange connector cables without affecting the look and shape of the charger unit 210. As noted above, the interface portions of the storage cavities designated for receiving the distal heads of connector cables can be designed to receive a variety of connection interfaces, which facilities the removal and replacement of connector cables as may be necessary.

Additionally, when one of the connector cables 225 has been completely removed from its storage cavity 250, one of the output connection ports 224 then is exposed and may be used to connect an electronic device using a different connector cable. For example, a squid connector can be inserted into one of the output connection ports 224 to connect two or more devices to the charger via a single output port.

The charger housing 220 also includes a power indicator means 228 that will indicate not only that an electrical current is being supplied to one or more electronic devices connected to the charger unit, but also what the remaining capacity of the internal battery 226 in the charger unit 210 is. For example, in an embodiment of the present invention illustrated in FIG. 11, the power indicator means 228 comprises designators that light up to indicate the battery capacity remaining in the power charger. Specifically, an "E" indicates that the battery is close to empty (e.g., about 1% to about 33%), and lights up with a red LED light. The "½" symbol indicates that the battery is about half full (e.g., about 34% to about 66%), and lights u with a yellow LED light. Lastly, an "F indicates a full or close to full battery (e.g., about 67% to about 99%), and lights up with a green LED light. Alternatively, the power indicator means may comprise a series of lights—when the battery 226 is at full capacity, all the lights will be lit up, and as the battery power decreases, the lights will correspondingly decrease by one as the power is used such that if there is no capacity left in the internal battery, none of the lights will be lit up. Alternatively, the power indicator means 228 can comprise a digital interface that provides a battery capacity level for the internal rechargeable battery unit 226, or another known means of providing battery level information.

In preferred embodiments of the present invention, the charger unit turns on when an electronic device needing charging is plugged into the charger unit. In alternate embodiments of the present invention, the charger unit may include "shake-to-activate" technology, such as disclosed in co-pending U.S. application Ser. No. 13/800,996, incorporated herein by reference, whereby the unit may be turned on by shaking the charger housing. In further alternate embodiments, the charger unit can include an on/off button or switch for activating and deactivating the unit, such as the on/off button 129 shown in FIG. 1 or the on/off button 229 shown in FIG. 11.

The charger housing encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

Referring to FIG. 12, the charger unit 210 comprises numerous internal components that are similar to, and similarly numbered as, the components described with reference to FIG. 5. Except as further discussed herein, it can be assumed the internal components of the charger unit 210 are substantially similar to those of the charger unit 110 as shown in FIG. 5.

The charger unit 210 comprises a controller, including a processing unit 232, which is configured to execute instructions and to carry out operations associated with the charger unit 210. For example, the processing unit 232 can keep track of the capacity level of the battery unit 226, store data or provide a conduit means by which data can be exchanged between electronic devices, such as between a smart phone and a computer. The processing unit 232 communicates with the battery unit 226 to determine how much capacity is remaining in the battery 226. Upon determining the capacity level, the processing unit 232 communicates with the power indicator means 228 to provide the user with the appropriate signal for showing how much capacity is remaining in the internal rechargeable battery unit 226. In still further embodiments, indicator means can be provided to show the battery capacity level of one or more electronic devices connected to the charger unit 210.

The processing unit 232 also includes a smart interface to determine the total current required for the specific devices connected to the charger unit 210. For example, if two devices are connected to the charger unit 210 via each of the output ports 224, the processing unit 232 will assess how much power is needed to fully charge each of the devices and efficiently allocate an appropriate current to each of the devices at a node 234 so that each device can be charged in the shortest amount of time without interfering with the charging operation of the other device or without overloading the capacity of the charger unit 10. Similarly, if four devices are connected to the charger unit 210 via various means connected to the output ports, the processing unit 232 will likewise assess how much power is needed to fully and efficiently charge each of the devices. In this regard, the processing unit 232 operates in connection with the input/output (I/O) support circuitry to control interactions with devices connected to the charger unit 210. The I/O support circuitry may be integrated with the processing unit 232 or may be a separate component. Generally, the I/O support circuitry operates by exchanging power (and possibly data) between the charger unit 210 and electronic devices connected thereto via the output ports 224.

The processing unit 232 also preferably implements a timer for automatically turning the charger unit 210 off if there is no device attached to the unit 210 for a predetermined period of time. In this regard, the capacity of the battery 226 can be preserved. Upon shut down of the charger unit 210, the power indicator means 228 will indicate that the charger 210 is being turned off—for example, the lights will provide a sequential blinking signal.

The processing unit 232 further includes a storage unit 236 that provides a place to hold data or instructions for operation of the charger unit 210 and rechargeable battery unit 226, or data exchanged between the charger unit 210, a computer, and electronic devices connected to the charger unit 210, or memory needed for further operations of the charger unit 210.

Referring to FIG. 9, the charger housing 220 preferably includes a power input port 222 for connecting the charger unit 210 to an external power source to recharge the internal rechargeable battery unit. As shown, the power input port 222 comprises a USB port, but can take the form of any known interface for connecting a device with a power source, including but not limited to a mini-USB interface, a micro-USB interface, or an AC-to-DC connector interface. Additionally, or alternatively, an AC wall plug interface 223 can also be provided for recharging the internal battery unit directly from a wall socket. As illustrated in FIG. 9, the wall plug interface 223 is provided on the back of the charger housing 220 and is preferably pivotable between a retracted, storage position, as shown, and an extended, use position where the prongs of the wall plug interface 223 project out and away from the charger housing 220 for engagement with a standard wall socket. In the retracted position, the prongs of the wall plug interface 223 are pivoted to a storage position within the volume of the charger housing 220 so as not to interfere with use of the charger unit 210 when the plug function is not needed. The storage cavity for the wall plug interface 223 is designed so that the prongs can be easily pivoted to the extended position to plug the entire charger 210 directly into a wall socket. Where a wall socket is not available, the charger unit 210 could be recharged via the USB connection input port 222, where included.

In an alternate embodiment of the charger unit 210, the charger housing 220 can include one or more additional output connection ports comprising, for example, a USB port for receiving a separate connector cable (e.g., a USB cable) to attach additional devices to the charger unit 210. Indeed, a squid connector, such as described and shown in co-pending U.S. application Ser. No. 13/571,992, can be used to connect multiple devices to the charger unit 210 even when both of the connector cables 225a and 225b are already connected to respective devices. Still further, one of the attached connector cables 225a or 225b may be designated as a power input connection for recharging the internal rechargeable battery, and the other connector cable 225a or 225b and an output port (e.g., port 222 shown in FIG. 6) provided on the charger housing 210 can be used to charge multiple electronic devices simultaneously. In such a situation, the output port requires a separate cable to be connected between the charger unit 210 (via the output port) and the device(s) to be recharged.

A charger unit designed in accordance with the present invention is adaptable to recharge an electronic device connected to the charger unit directly from the internal rechargeable battery unit or alternately from a power source to which the charger unit is connected. Thus, the charger unit can be a conduit through which a charge is provided from a standard power source, such as a wall socket, a car charger socket, an airplane charger socket, or even a computer. In this situation, the power charge bypasses the internal battery unit. Indeed, in a preferred embodiment of the present invention, a charge provided from a standard power source can recharge the internal battery unit simultaneously with one or more electronic devices connected to the charger unit. Additionally, the portable charger unit can be disconnected from a standard power source, even when electronic devices are connected to the charger unit, and continue to recharge the electronic device from the internal battery unit without interfering with the recharging process. For example, the charge switches from the external power source to the internal battery unit as necessary.

As referred to above, the connector cables are removable and interchangeable as desired. The connector cables are preferably flexible so that they can be bent away from the charger housing to connect to an electronic device during use of the charger unit. The flexibility also assists in removing the entire connector cable from its storage cavity when necessary.

Referring to FIGS. 6-9, additional features can be provided to increase the functionality of the charger unit. For example, an LED lightbulb 270 can be included on the charger to provide some light to assist in using the charger or for simple use as a flashlight.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable charger unit for recharging one or a plurality of electronic devices, each having a rechargeable internal battery, said portable charger unit comprising:
   a charger housing internally storing a rechargeable battery;
   a power input port operatively connected to the internal battery for providing an electrical charge from an external power source to the charger unit and for recharging the internal battery when the charger unit is connected to said power source;
   at least one power output port operatively connected to the internal battery for providing an electrical charge from the internal battery to an electronic device when said electronic device is connected to the charger unit via the output port; and
   at least one connector cable comprising a flexible body that joins a proximal head to a distal head, and removably attached to the power output port by a connection interface of the proximal head, the flexible body housing a conductor that electrically connects the connection interface of the proximal head to a connection interface of the distal head, said connector cable thereby capable of connecting an electronic device to the charger unit via said at least one power output port,
   wherein said connector cable is removably attached to the power output port by the connection interface such that said connector cable can be removed and reattached without disassembly of the charger housing,
   wherein said charger housing comprises a storage cavity defined along an edge thereof, said storage cavity including a proximal portion for receiving the proximal head of the connector cable, a distal portion for receiving the distal head of the connector cable, and a channel connecting the proximal and distal portions for receiving the body of the cable,
   wherein the connector cable in a non-use condition can be fully inserted into the storage cavity such that the entirety of an outward surface of the connector cable forms a smooth continuity with an outer surface of the charger housing.

2. The portable charger unit according to claim 1, comprising two connector cables each removably attached by its proximal interface with a respective power output port in the charger housing, and comprising two storage cavities formed in the charger housing each for receiving one of the two connector cables.

3. The portable charger unit according to claim 2, wherein the two storage cavities are formed at opposite edges of the charger housing.

4. The portable charger unit according to claim 2, comprising three connector cables each operatively connected with a respective output port on the charger housing for attachment to respective electronic devices for recharging the internal rechargeable batteries of said devices when so attached, and
   wherein said charger housing includes three storage cavities, one for each of said connector cables, for receiving said cables in a non-use condition, wherein two of said storage cavities are positioned at opposing edges of said charger housing, and the third of said storage cavities is positioned on a top side of said storage housing.

5. The portable charger unit according to claim 1, wherein the body and the distal head of the connector cable are split to provide first and second bodies that connect the proximal head of the connector cable with respective separately movable first and second distal heads of the connector cable, wherein the channel of the storage cavity is shaped to fit the first and second bodies and the distal portion of the storage cavity is shaped to fit the first and second distal heads in side-by-side relationship.

6. The portable charger unit according to claim 1, further comprising a processing unit operatively connected to the internal battery for controlling recharging of the internal battery when said charger unit is connected to an external power source via the power input port and for controlling recharging of electronic devices connected to the charger unit via the at least one power output port.

7. The portable charger unit according to claim 6, further comprising power indicator means provided on the charger housing and operatively controlled by the processing unit to indicate at least one of the power capacity in the internal battery of the charger unit or the power capacity of an electronic device connected to the charger unit via said at least one output port.

8. The portable charger unit according to claim 1, further comprising a detachable squid connector having a first end comprising a connection interface for engagement with the power output port of the charger unit and a second end comprising two or more connection interfaces for engagement with respective electronic devices.

9. The portable charger unit according to claim 1, further comprising an adapter unit designed for connection with an external power source and for connection to the power input port of the charger unit for supply a power charge from said external power source when the adapter unit is connected with both the external power source and the charger unit, said adapter unit comprising:
   a main body;
   a connector cable for engagement with the power input port of the charger unit; and
   at least one of a wall socket plug interface, a car charger interface, an airplane charger interface, or a USB connection interface.

10. The portable charger unit according to claim 1, wherein said charger unit is capable of recharging the internal battery of the charger unit by a connection with an external power source at the same time as one or more electronic devices are being recharged by the charger unit.

11. The portable charger unit according to claim 1, wherein said charger unit recharges two or more electronic devices connected to the charger unit via said connector means simultaneously.

12. A portable charger kit for recharging one or a plurality of electronic devices, each having a rechargeable internal battery, said portable charger kit comprising:
   a portable charger unit, comprising:
      a charger housing internally storing a rechargeable battery;
      a power input port operatively connected to the internal battery for providing an electrical charge from an external power source to the charger unit and for recharging the internal battery when the charger unit is connected to said power source;
      at least one power output port operatively connected to the internal battery for providing an electrical charge from the internal battery to an electronic device when said electronic device is connected to the charger unit via the output port;

a first connector cable comprising a flexible body that joins a proximal head to a distal head, and having a proximal connection interface at the proximal head, the flexible body housing a conductor that electrically connects the proximal connection interface to a first distal connection interface at the distal head; and a second connector cable comprising a flexible body that joins a proximal head to a distal head, and having a proximal connection interface at the proximal head, the flexible body housing a conductor that electrically connects the proximal connection interface to a second distal connection interface at the distal head, said second distal connection interface being differently shaped from the first distal connection interface, wherein each said connector cable is removably attachable to the power output port by the proximal connection interface such that each said connector cable can be removed and reattached without disassembly of the charger housing, each said connector cable thereby capable of connecting an electronic device to the charger unit via said at least one power output port, wherein the first distal connection interface permits of connecting an electronic device of a first type, whereas the second distal connection interface permits of connecting an electronic device of a second type, wherein said charger housing comprises a storage cavity defined along an edge thereof, said storage cavity including a proximal portion for receiving the proximal head and proximal connection interface of the first or second connector cable, a distal portion for receiving the distal head and distal connection interface of the first or second connector cable, and a channel connecting the proximal and distal portions for receiving the body of the first or second connector cable, wherein either of the first or second connector cables in a non-use condition can be fully inserted into the storage cavity such that the entirety of an outward surface of the connector cable forms a smooth continuity with an outer surface of the charger housing.

13. The portable charger kit according to claim 12, wherein the charger housing comprises a second storage cavity mirror-identical to the first storage cavity, such that both of the first and second connector cables in non-use conditions can be simultaneously fully inserted into respective storage cavities such that the entireties of their outward surfaces form smooth continuities with the outer surface of the charger housing.

14. The portable charger kit according to claim 12, further comprising an adapter unit designed for connection with an external power source and for connection to the power input port of the charger unit for supplying a power charge from said external power source when the adapter unit is connected with both the external power source and the charger unit, said adapter unit comprising:
a main body;
a connector cable for engagement with the power input port of the charger unit; and
at least one of a wall socket plug interface, a car charger interface, an airplane charger interface, or a USB connection interface.

15. The portable charger kit according to claim 12, wherein said kit recharges two or more electronic devices connected to the charger unit via said first and second connector cables simultaneously.

16. The portable charger kit according to claim 12, comprising a third connector cable having a proximal end attached and electrically connected to a power output port within the charger housing, and having a distal head and distal connection interface connected by a flexible body and conductor to the proximal end,
wherein the charger housing includes first and second storage cavities positioned on opposing edges of the charger housing for the respective first and second connector cables, and includes a third storage cavity positioned on a top side of the charger housing for the third connector cable.

17. A portable charger kit for simultaneously recharging a plurality of electronic devices, each having a rechargeable internal battery, said portable charger kit comprising:
a portable charger unit, comprising:
a charger housing internally storing a rechargeable battery;
a power input port operatively connected to the internal battery for providing an electrical charge from an external power source to the charger unit and for recharging the internal battery when the charger unit is connected to said power source;
at least one power output port operatively connected to the internal battery for providing an electrical charge from the internal battery to an electronic device when said electronic device is connected to the charger unit via the output port; and
an adapter unit designed for connection with an external power source and for connection to the power input port of the charger unit for supply a power charge from said external power source when the adapter unit is connected with both the external power source and the charger unit, said adapter unit comprising:
a main body;
a connector cable for engagement with the power input port of the charger unit; and
at least two of a wall socket plug interface, a car charger interface, an airplane charger interface, and a USB connection interface; and
a split connector cable having a first end comprising a proximal head and proximal connection interface for engagement with the power output port of the charger unit and a second end comprising two or more distal heads and distal connection interfaces for engagement with respective electronic devices, wherein the charger housing includes a storage cavity for receiving the split connector cable, the storage cavity includes a proximal portion for receiving the proximal head and connection interface also includes a distal portion for receiving the distal heads and connection interface in side-by-side relationship.

* * * * *